Patented Mar. 3, 1925.

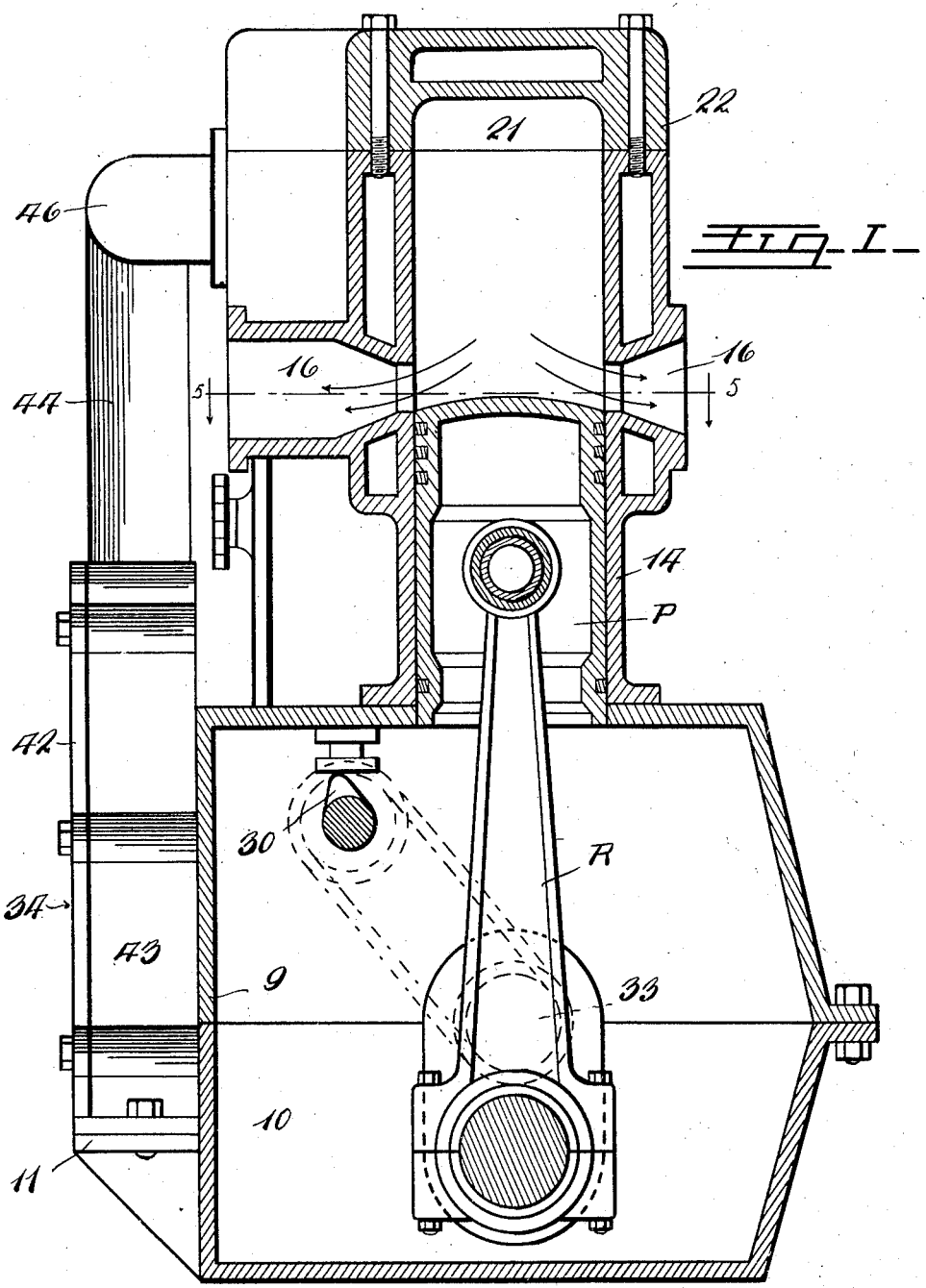

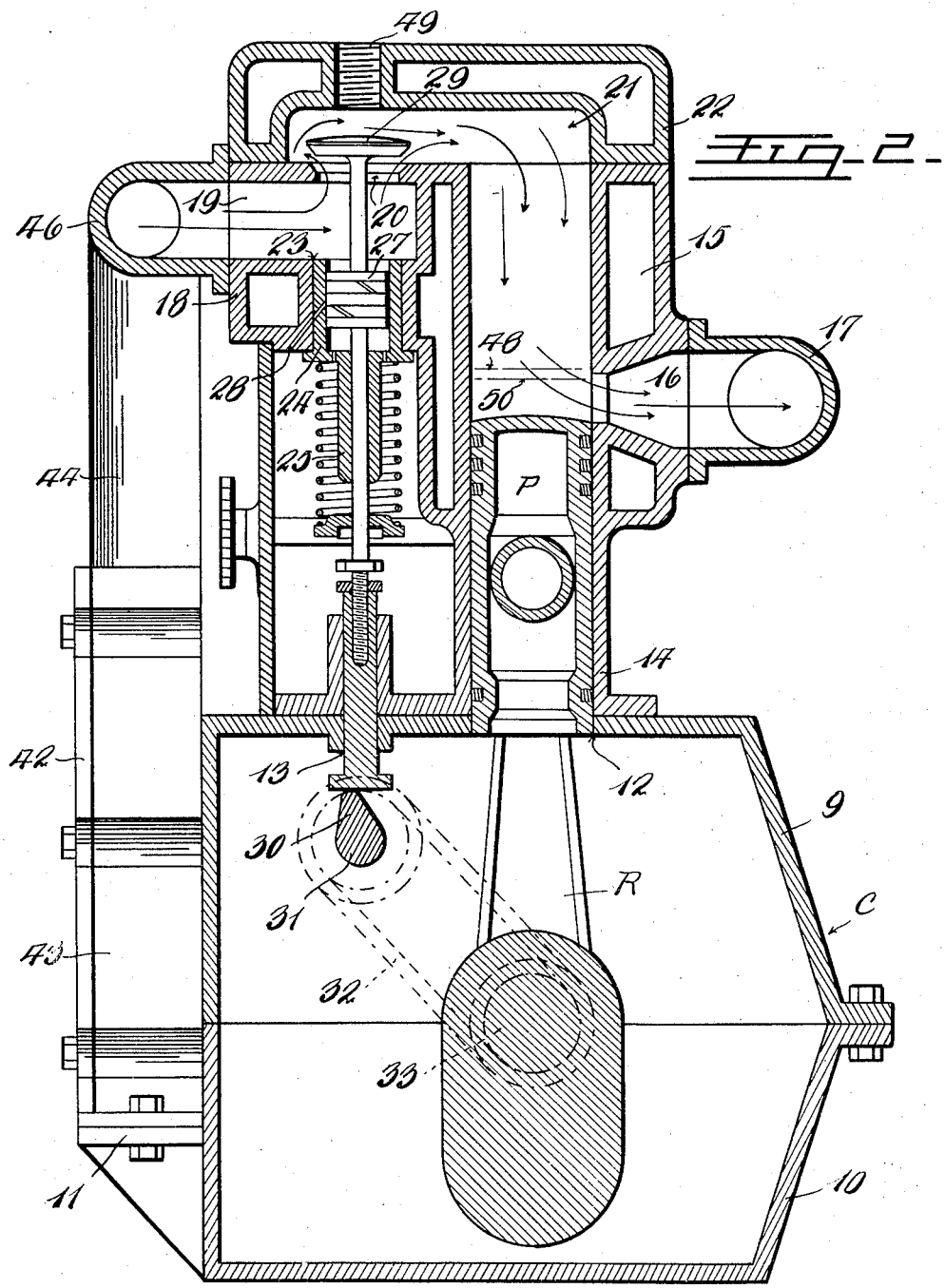

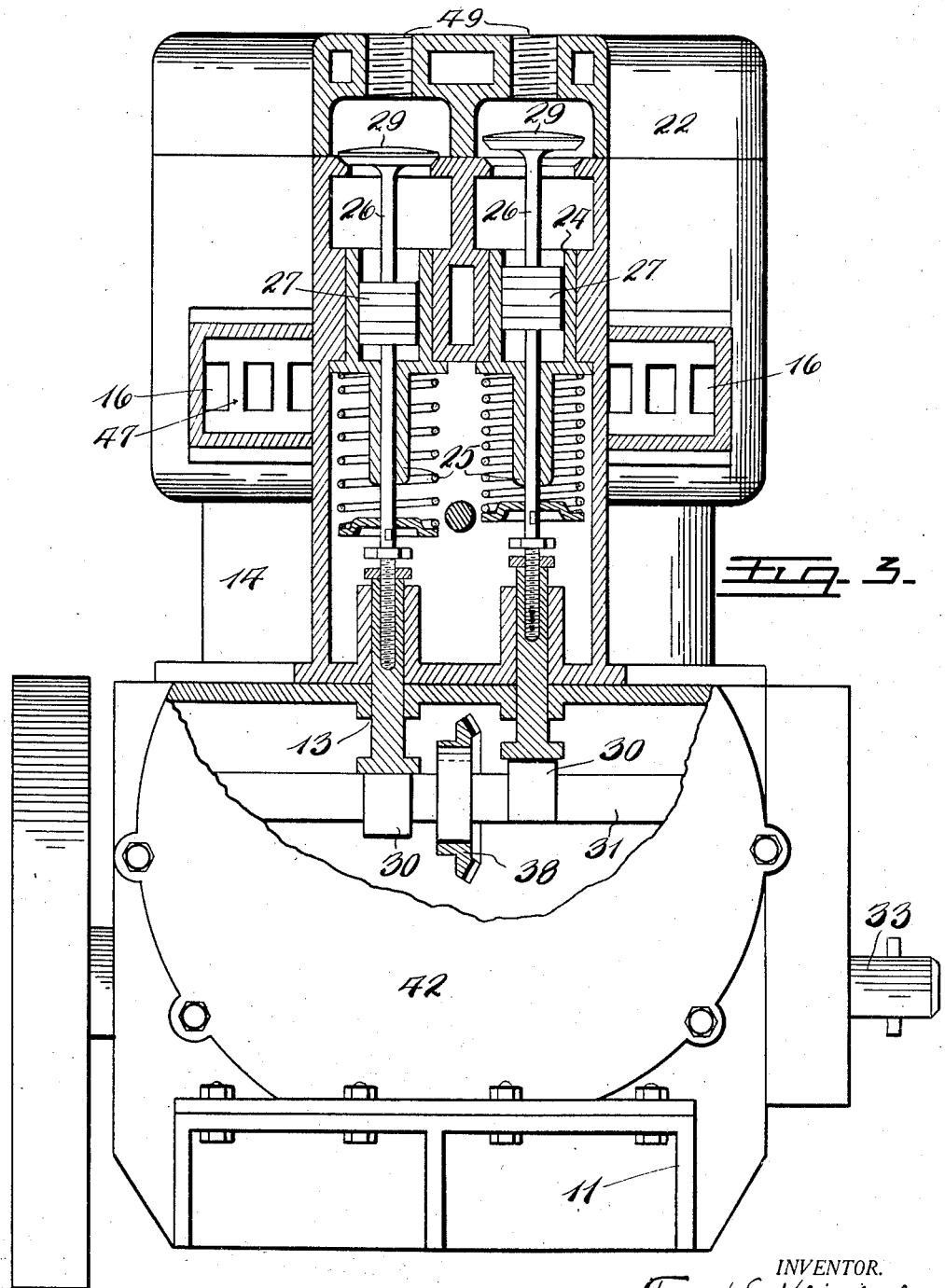

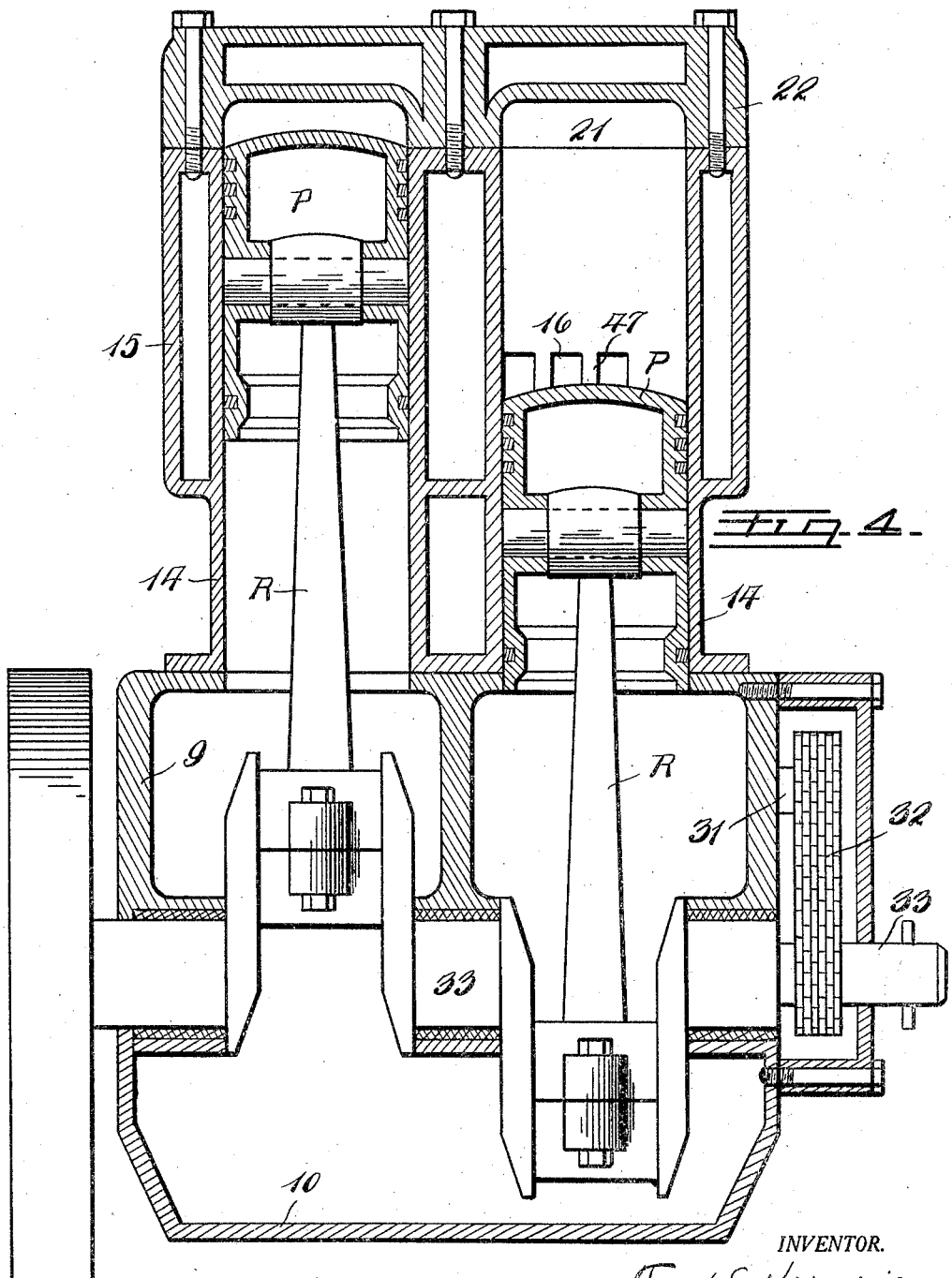

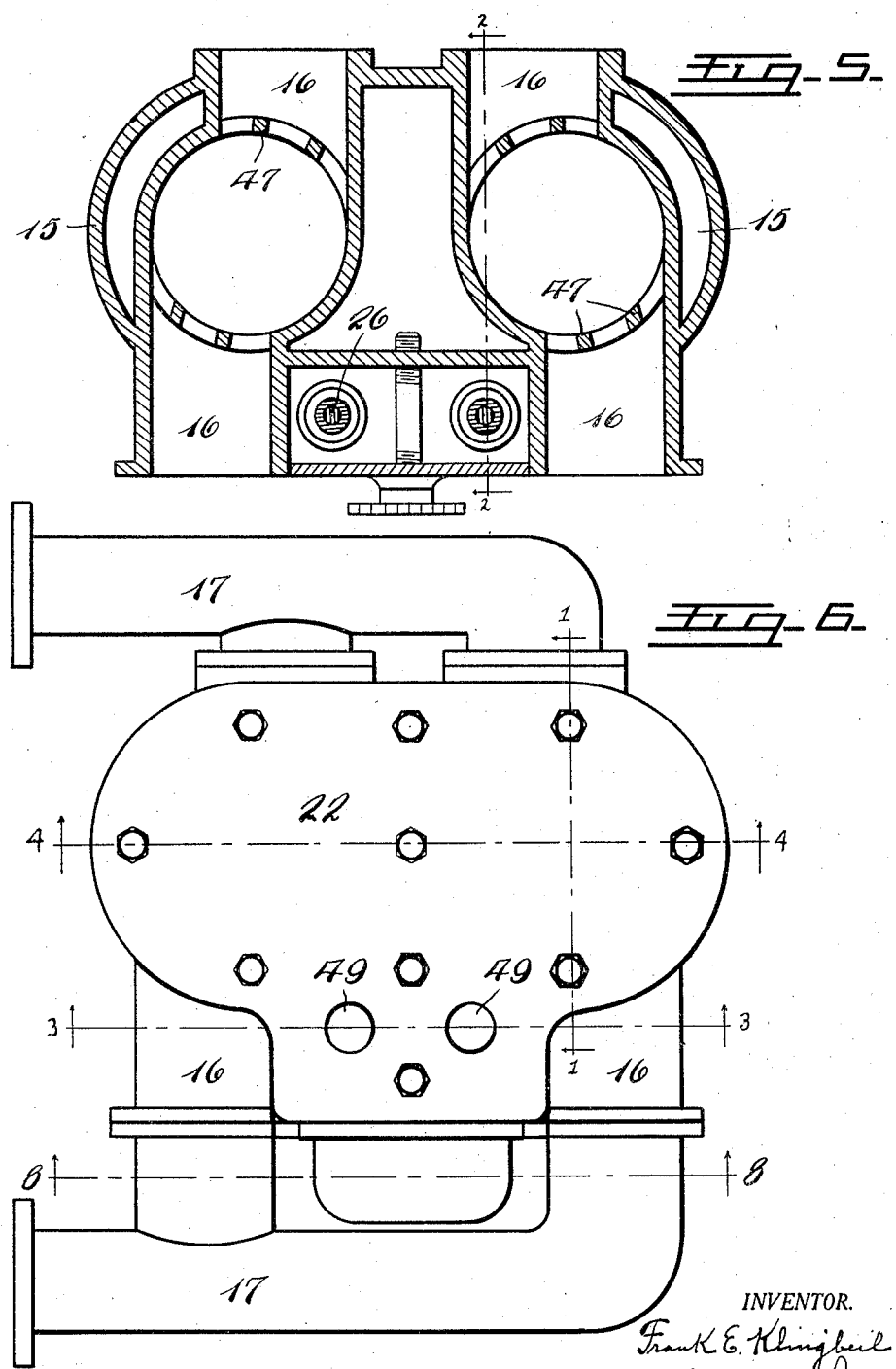

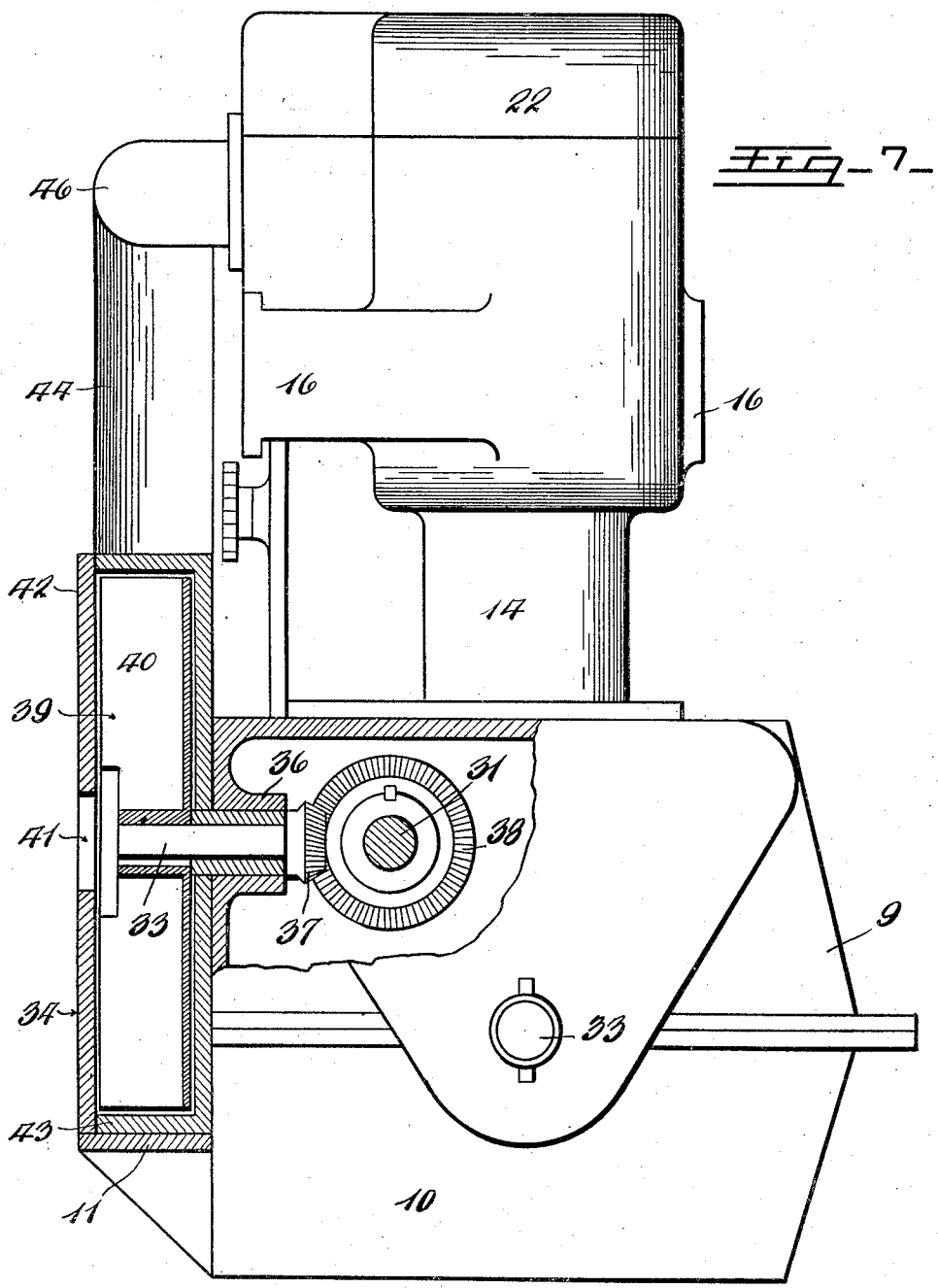

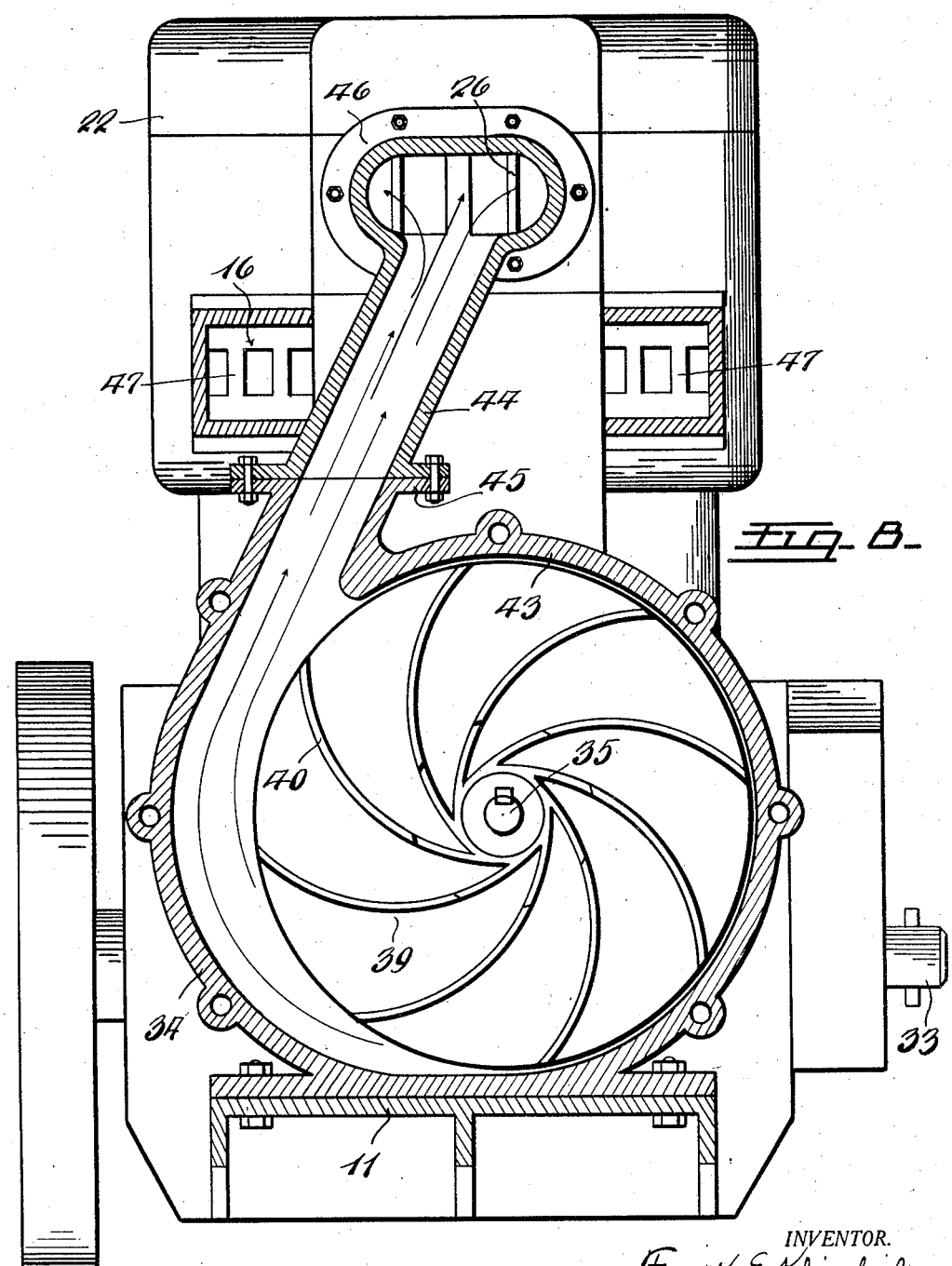

1,528,216

UNITED STATES PATENT OFFICE.

FRANK E. KLINGBEIL, OF CLEVELAND, OHIO.

TWO-CYCLE INTERNAL-COMBUSTION ENGINE.

Application filed January 4, 1924. Serial No. 684,355.

*To all whom it may concern:*

Be it known that I, FRANK E. KLINGBEIL, citizen of the United States, residing at Cleveland, in the county of Cuyahoga and State of Ohio, have invented certain new and useful Improvements in Two-Cycle Internal-Combustion Engines, of which the following is a specification.

This invention relates to improvements in two-cycle internal combustion engines having for an object to provide means whereby to insure an absolutely clean explosive charge at every explosion.

Another object is to provide an engine of this character which will have a wide speed range and unusual flexibility, and in addition may be rapidly accelerated or throttled.

Another object is to provide an engine including means to eliminate back firing.

A further object is to provide an engine of this character having an explosive charge delivering mechanism driven directly from the cam shaft, the entire assembly being compactly constructed to reduce lost motion to a minimum.

A still further object is to provide an engine of this character in which the exhaust ports are of such relative size and formation as to permit of a quick exhaust of the burnt charge.

Other objects will be in part obvious and in part pointed out hereinafter.

In order that the invention and its mode of operation may be readily understood by persons skilled in the art, I have in the accompanying illustrative drawings, and in the following detailed description based thereon set out one possible embodiment of the same.

In these drawings:

Fig. 1 is a cross sectional view substantially on the line 1—1 of Figure 6;

Fig. 2 is a cross sectional view substantially on the line 2—2 of Figure 5;

Fig. 3 is a view taken substantially on the line 3—3 of Figure 6;

Fig. 4 is a vertical longitudinal section taken substantially on the line 4—4 of Figure 6;

Fig. 5 is a horizontal section taken on the line 5—5 of Figure 1.

Fig. 6 is a top plan view.

Fig. 7 is an end elevation with portions broken away to show the connection between the cam shaft and the explosive charge delivering mechanism.

Fig. 8 is a sectional view taken substantially on the line 8—8 of Fig. 6.

While it is to be understood that the structure of this two-cycle engine may include one or more cylinders, each mounting pistons therein, for the sake of clearness and convenience the following description will be directed to the construction of a single cylinder.

Having more particular reference to the drawings throughout which similar characters of reference designate similar parts, this improved engine may be broadly stated as comprising the usual crank case, mounting a cylinder provided intermediate its ends with a pair of opposed exhaust ports which are adapted to be opened and closed by means of the piston which has the usual piston rod and crank shaft connections. Arranged at the upper end of the cylinder is an inlet port which is intermittently opened and closed by means of a cam operated valve. This valve controls the flow of explosive charge to the cylinder from a centrifugal pump mechanism which is mounted upon the crank case and which draws a supply of gas from any desired source. The arrangement of pairs of opposed exhaust ports constructed as illustrated will obviously permit of rapid discharge of burnt gases from the cylinder and thereby insure the firing of an absolutely clean charge at every explosion.

The crank case "C" is preferably made up of upper and lower halves 9 and 10 respectively, these halves being bolted or otherwise connected. The lower half 10 is provided at one side with an angular bracket 11 whose function will be hereinafter pointed out. The upper half 9 of the crank case is provided with pairs of spaced openings 12 and 13, the opening 12 being of greater diameter than the opening 13 and being adapted to be vertically alined with the opening in a cylinder block 14.

This cylinder block 14 as shown is provided with the usual water or cooling jacket 15 for obvious reasons and intermediate its ends with a pair of opposed circumferentially extending exhaust ports 16 which are adapted for communication with a pair of longitudinally extending exhaust pipes 17, these exhaust pipes being bolted or otherwise secured in position. Arranged at the upper end of the cylinder block and extending to one side thereof is a shell 18 in which is formed a passage way 19 having communication with the explosion chamber through a valve opening 20 and a channel portion 21 which is formed in the under face of the cylinder head 22. An intermittently operated valve 29 is arranged to control the inlet of the explosive charges.

For the purpose of providing a constant supply of explosive charge to the cylinder I provide a rotary propeller mechanism 34 mounted upon the bracket 11 of the crank case, said mechanism being adapted to draw gas from any desired source. This rotary propeller mechanism includes a transverse shaft 35 which is mounted in a bearing 36 formed upon the inner face of the upper half of the crank case and has arranged upon its inner end a bevel pinion 37 adapted to mesh with the bevel gear 39, which as shown is keyed to a cam shaft 31. This connection provides for rotation of the transverse shaft 35, the speed of which is preferably twice that of the cam shaft, thus providing means for maintaining a constant pressure of explosive charge to the cylinder. Keyed to the outer portion of the transverse shaft 35 is a rotary propeller 39 which consists of a circular back plate having curved blades 40 thereon. As shown, the portions of the blades at points adjacent the shaft are cut away to provide for the intake of gas through the opening 41 formed in the cover plate 42 of a substantially drum shape housing 43 which as illustrated is screwed to the bracket 11 and the crank case. An intake manifold 44 is connected to the flange portion 45 of the housing 43, the upper end of this manifold being enlarged and flanged for attachment to the adjacent portion of the cylinder block. This enlarged portion or head 46 is adapted to be alined with the passage way 19 and with operation of the engine, provides means for feeding an explosive charge to the cylinder. The pressure maintained by the propeller mechanism is such as to prevent backing up of burning gas into the passage way 19 while exhaustion of the burnt charge is in progress. It is understood that at other times the valve 29 prevents the backfiring.

It is obvious that upon movement of the piston within the cylinder there would be a tendency for expansion of the rings upon being positioned adjacent the exhaust ports and to provide against this I have provided a set of vertically arranged guide members 47 which will prevent this expansion but will not retard the discharge of burnt gases from the cylinder.

In operation of this engine, assuming the parts to be positioned as illustrated in Figure 2 of the drawings, the explosive charge enters the cylinder through the opening 20, forcing or blowing out the burnt gases and filling the explosion chamber with a new clean charge. The crank shaft being continously rotatable moves the piston upwardly and upon reaching the position indicated by the dash line 48, prevents further escape of gases from the cylinder and begins to compress the charge in the upper end. It is obvious that the inlet valve 29 at this point is entirely closed and prevents backing up of the explosive charge into the passage way 19. A spark plug is adapted to be arranged in the opening 49 and ignites the compressed charge upon movement of the piston to its uppermost position. On the down stroke of the piston the valve 29 begins to open at the time the piston reaches the position indicated by the dash line 50 with the result that an incoming explosive charge exhausts the burnt gases through the opposed ports 16, this operation being materially quickened due to the convex formation of the upper end of the piston, this formation tending to divide the gases being discharged and prevent retention of any part to be mixed with the new charge.

While other valve mechanisms may be used I preferably employ the type illustrated, in which the valve opening 20 is vertically alined with a second opening 23 wherein is mounted a sleeve 24 having formed integrally therewith a depending valve stem guide 25 in which the valve stem 26 is slidably mounted. The interior of the sleeve 24 is of sufficient size to accommodate a piston 27 carried by the valve stem 26, this piston having mounted thereon suitable rings whereby to provide against leakage of portions of the explosive charge thereby. The lower end of this sleeve is provided with vents whereby to prevent compression of air within the sleeve upon downward movement of the valve. In order to provide for lubrication of the piston 27 I have formed in the sleeve and the shell 18 an opening 28 through which a lubricant may be introduced. As shown, the valve head 29' is of ordinary construction and is employed to open and close the valve opening 20. This valve mechanism includes the usual spring and cam engaging rod which is engaged by cams 30 arranged upon a cam shaft 31 which is driven by a silent chain 32 which is trained over chain sprockets carried by the cam shaft and the crank shaft 33, the crank shaft as is understood, being connected to the piston P by means of a connecting rod R.

Manifestly, the construction shown is capable of considerable modification and such modification as may fall within the scope of my claims, I consider within the spirit of my invention.

I claim:

1. A two-cycle internal combustion engine comprising a cylinder having a pair of opposed exhaust ports intermediate its ends and an inlet port at its upper end, an intermediate operable valve for said inlet port, a piston arranged in the cylinder and adapted to alternately open and close the exhaust ports, a crank shaft having connection with the piston, a cam shaft driven by and at the same speed of the crank shaft, said cam shaft being adapted to operate the valve, a substantially drum shaped housing mounted upon one side of the engine, an intake manifold connecting the drum and the inlet port, a transverse shaft having one end disposed adjacent the cam shaft, gear connection between the cam shaft and said transverse shaft, and a rotary propeller mechanism, operable by the transverse shaft to deliver an explosive charge to the inlet port under pressure.

2. A two-cycle internal combustion engine comprising a cylinder having a pair of opposed exhaust ports intermediate its ends, and an intake port in its upper end, an intermittently operable valve for the inlet port, a piston arranged in the cylinder and adapted to open and close the exhaust ports, a crank shaft having connection with the piston, a cam shaft driven by and at the same speed as the crank shaft and adapted to operate said valve, a bevel gear carried by the cam shaft, a crank case, a vertically disposed drum shaped housing mounted on the crank case, an intake manifold connecting the housing and inlet port, a transverse shaft arranged in the housing and having one end extended through the crank case and terminating near the bevel gear, a bevel pinion carried by said transverse shaft and meshing with said bevel gear, and a propeller rotatable with the transverse shaft to deliver an explosive charge to the inlet port.

3. A two-cycle internal combustion engine comprising a cylinder having an inlet port in its upper end and a pair of opposed exhaust ports intermediate its ends, an intermittently operable valve for the inlet port, a piston arranged in the cylinder and adapted to open and close the exhaust ports, a crank shaft having connection with the piston, a cam shaft driven by the crank shaft, a crank case, a transverse shaft having one end extending outwardly from the crank case, a gear connection between the cam shaft and the transverse shaft, a rotary propeller keyed to the outer portion of the transverse shaft, and a housing for the propeller, said housing having connection with the inlet port to convey explosive charges thereto.

4. The combination with a two-cycle internal combustion engine including a cylinder having an inlet port in its upper end, an exhaust port between its ends, a piston crank case, crankshaft and a cam shaft; of a transverse shaft journaled in one side wall of the crank case, a gear train between the transverse shaft and cam shaft, a propeller fixed to the outer end of the transverse shaft and a housing enclosing the propeller, communicating with the inlet port and adapted to feed fuel therethrough.

5. The combination with a two-cycle internal combustion engine including a cylinder having an inlet port in its upper end, an exhaust port between its ends, a piston, crank case, crankshaft and a cam shaft; of a transverse shaft journaled in one side wall of the crank case, a bevel gear carried by and rotatable with the cam shaft, a pinion bevel gear fixed to the inner end of the transverse shaft and meshing with the bevel gear, a propeller fixed to the outer end of the transverse shaft, a casing enclosing the propeller and having a fuel inlet opening, and a manifold connecting the casing and the inlet port.

FRANK E. KLINGBEIL.